W. H. ALLEN.
Automatic Grain Weigher and Register.

No. 216,929. Patented July 1, 1879.

WITNESSES:
Chas. Nida
C. Sedgwick

INVENTOR:
W. H. Allen
BY Munn & Co
ATTORNEYS.

UNITED STATES PATENT OFFICE

WILLIAM H. ALLEN, OF NEW YORK, N. Y.

IMPROVEMENT IN AUTOMATIC GRAIN WEIGHER AND REGISTER.

Specification forming part of Letters Patent No. 216,929, dated July 1, 1879; application filed November 16, 1878.

*To all whom it may concern:*

Be it known that I, WILLIAM HENRY ALLEN, of the city, county, and State of New York, have invented a new and useful Improvement in Automatic Grain Weigher and Register, of which the following is a specification.

Figure 1:
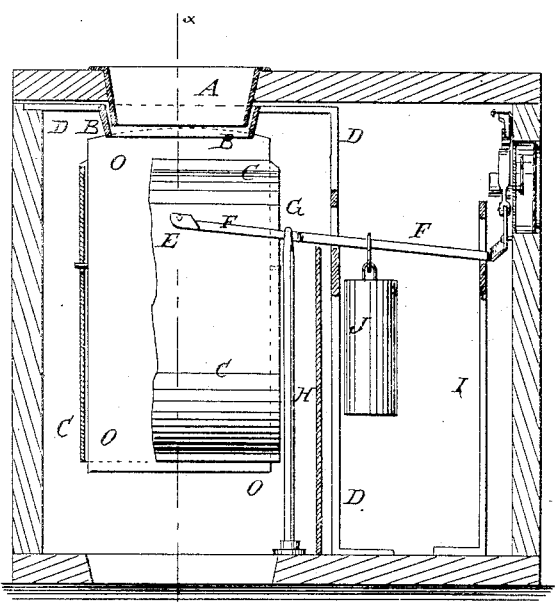
Figure 2:
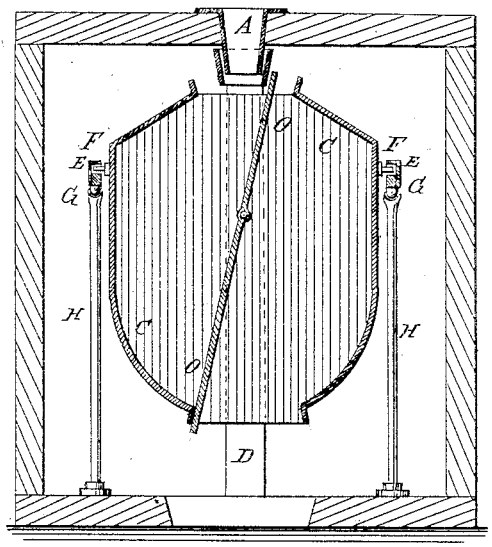
Figure 3:
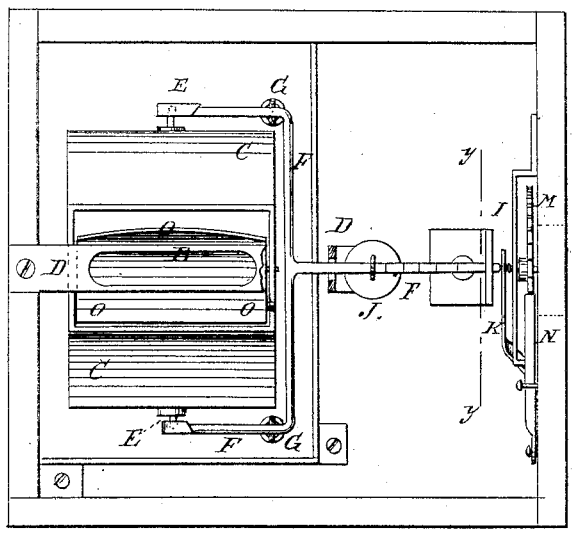
Figure 4:
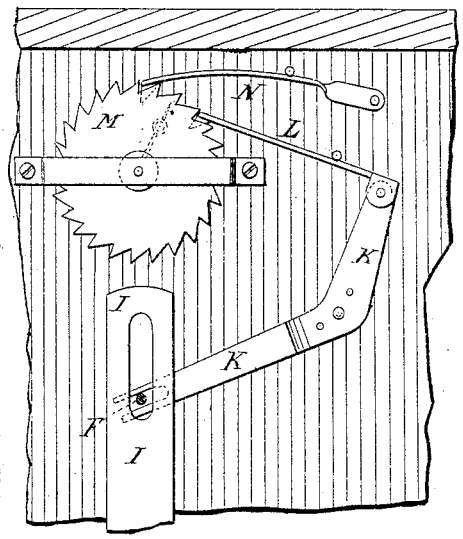

Figure 1 is a side view of my improved apparatus, partly in section, to show the construction. Fig. 2 is a vertical cross-section of the same, taken through the line $x$ $x$, Fig. 1. Fig. 3 is a top view of the same. Fig. 4 is a detail vertical section, taken through the line $y$ $y$, Fig. 3, showing the counting apparatus.

Similar letters of reference indicate corresponding parts.

The object of this invention is to furnish an apparatus for weighing grain, flour, and other similar substances as they flow from a spout into a hopper or other receiver, which shall be so constructed as to deliver the substance in exact and uniform quantities, and at the same time accurately register the quantities delivered.

The invention consists in the combination of the open-bottomed suspended vessel, the pivoted partition, the balancing-lever, and the balancing-weight with each other, the spout, and a registering device for weighing a substance automatically as it flows from the said spout, as hereinafter fully described.

A represents the spout leading from a bin, elevator, or other place, and through which it passes into and through the spout B into the vessel C. The spout B is attached to a frame, D, or other support, so that its lower end may always be in exactly the same position.

The vessel C is made of such a size as to easily contain more than twice the quantity to be weighed at a time. The vessel C is made with a hopper-shaped or concaved bottom, having a large opening in its lower part.

The vessel C is divided into two compartments by a partition, O, which is pivoted at or a little above the middle parts of its side edges to the middle part of the ends of the vessel C.

The partition O is made of such a length as to oscillate easily within the vessel C, and of such a breadth that its lower edge may project through the opening in the bottom of the vessel C, and that its upper edge may overlap the side of the lower end of the spout B when the said vessel is raised, and may swing beneath the said lower end of the said spout B when the said vessel C is lowered.

To the sides of the vessel C are attached pivots E, to which are pivoted the ends of the branches of the forked lever F. The lever F is pivoted upon fulcrums G, attached to posts H, or to the frame-work within which the vessel C is placed. The other end of the lever F projects through a slot in the support D for the spout B and through a slot in the post I, so as to hold the said lever from lateral movement.

The outer arm of the lever F is provided with an adjustable weight, J, for regulating the amount of the substance to be received each time. The fulcrums and pivots of the lever F should be knife-edges, to make the apparatus very sensitive, and to give great accuracy in the results.

The free end of the lever F passes through a slot in the lower end of the bent lever K, which is pivoted at its angle to the frame-work of the apparatus, or to some other suitable support.

To the upper end of the bent lever K is pivoted the rear end of a pawl, L, the other end of which rests upon and engages with the teeth of a ratchet-wheel, M. The ratchet-wheel M is pivoted to some suitable support, and with its pivot is connected an ordinary register for recording the quantities measured or weighed by the apparatus.

The ratchet-wheel M is provided with a stop-pawl, N, to prevent the said ratchet-wheel M from being turned back by the friction of the pawl L when being drawn back for another stroke.

In weighing flour and other substances that do not readily pass through an opening, the inclined or concaved sides of the vessel C may also be pivoted to the ends of the said vessel, and may be connected with the oscillating partition O by rods or other suitable means, so as to be opened and closed by the movements of the said partition to enlarge the discharge-opening and allow the substance to escape freely and quickly.

In using the apparatus, the balancing-weight is adjusted as desired, and the substance is admitted into the closed compartment of the vessel C. As soon as the desired quantity has been received its weight overbalances the balancing-weight J and causes the vessel C to descend, which downward movement releases the upper end of the partition O, and the weight of the substance, resting against the side of its lower end, instantly reverses it and allows the substance to drop out. The sudden decrease of weight thus caused allows the vessel C to rise, with the upper end of the partition O at the other side of the spout B. These various movements of the apparatus occur almost simultaneously.

If desired, a cross-bar or bridge may be attached to the lower end of the spout B, and a small roller pivoted to the upper edge of the partition O to roll along the said bridge, and thus guard against the possibility of a kernel of grain catching between the edge of the spout B and the edge of the partition O, and thus impeding the movement of the said partition.

Having thus described my invention, I claim as new and desire to secure by Letters Patent—

The combination of the open-bottomed suspended vessel C, the pivoted partition O, the balancing-lever F, and the balancing-weight J with each other, the spout B, and a registering device for weighing a substance automatically as it flows from the said spout, substantially as herein shown and described.

WILLIAM H. ALLEN.

Witnesses:
JAMES T. GRAHAM,
C. SEDGWICK.